US011275608B1

(12) United States Patent
Natarajan et al.

(10) Patent No.: US 11,275,608 B1
(45) Date of Patent: Mar. 15, 2022

(54) SCALABLE JOB TRANSFORMATION AND MANAGEMENT

(71) Applicant: Amazon Technologies, Inc., Seattle, WA (US)

(72) Inventors: Vignesh Natarajan, Seattle, WA (US); Shreyas Yagna, Redmond, WA (US); Wesley Shawn Davis, Sammamish, WA (US); Henry A. Spang, Seattle, WA (US); Sidharth Bajaj, Seattle, WA (US); Sumit Kumar, Seattle, WA (US); Jared Alan Bergman, Seattle, WA (US); Tejal Borkar, Seatle, WA (US); Dmytro Sukhariev, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 306 days.

(21) Appl. No.: 16/002,229

(22) Filed: Jun. 7, 2018

Related U.S. Application Data

(60) Provisional application No. 62/652,101, filed on Apr. 3, 2018.

(51) Int. Cl.
  *G06F 9/46*    (2006.01)
  *G06F 9/48*    (2006.01)
  *G06F 9/50*    (2006.01)

(52) U.S. Cl.
  CPC .......... *G06F 9/4843* (2013.01); *G06F 9/5027* (2013.01); *G06F 2209/508* (2013.01); *G06F 2209/5011* (2013.01)

(58) Field of Classification Search
  CPC .............. G06F 9/4843; G06F 9/5027; G06F 2209/5011; G06F 2209/508
  See application file for complete search history.

(56) References Cited

U.S. PATENT DOCUMENTS

| | | | |
|---|---|---|---|
| 6,496,871 B1* | 12/2002 | Jagannathan | G06F 9/4862 709/202 |
| 6,622,156 B2 | 9/2003 | Hirabayashi | |
| 8,149,439 B2 | 4/2012 | Morales et al. | |
| 9,298,760 B1 | 3/2016 | Li et al. | |
| 9,767,130 B2 | 9/2017 | Bestler et al. | |
| 9,813,516 B2 | 11/2017 | Wang | |
| 9,927,941 B2 | 3/2018 | Steimle et al. | |
| 2007/0256058 A1* | 11/2007 | Marfatia | G06F 8/51 717/137 |
| 2013/0173686 A1* | 7/2013 | Hu | G06F 11/302 709/202 |
| 2016/0147573 A1* | 5/2016 | Shayesteh | G06F 9/505 718/104 |
| 2016/0292244 A1* | 10/2016 | Davis Jones | G06F 16/258 |

* cited by examiner

*Primary Examiner* — Camquy Truong
(74) *Attorney, Agent, or Firm* — Robert C. Kowert; Kowert, Hood, Munyon, Rankin & Goetzel, P.C.

(57) ABSTRACT

Methods, systems, and computer-readable media for scalable job transformation and management are disclosed. A plurality of tasks expressed in a first format are received at a host. The tasks are associated with a shard identifier based at least in part on one or more criteria, and the tasks are acquired by the host based at least in part on the shard identifier. A subset of the tasks having a common characteristic are determined. The subset of the tasks are aggregated into a job expressed in a second format, where the job represents the subset of the tasks. The job is provided to a job manager, and the subset of the tasks are scheduled for processing using the job manager.

20 Claims, 9 Drawing Sheets

SCALABLE JOB TRANSFORMATION AND MANAGEMENT

RELATED APPLICATIONS

This application claims the benefit of U.S. Provisional Application No. 62/652,101, entitled "SCALABLE JOB TRANSFORMATION AND MANAGEMENT," filed Apr. 3, 2018, and which is herein incorporated by reference in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

Figure 1A:
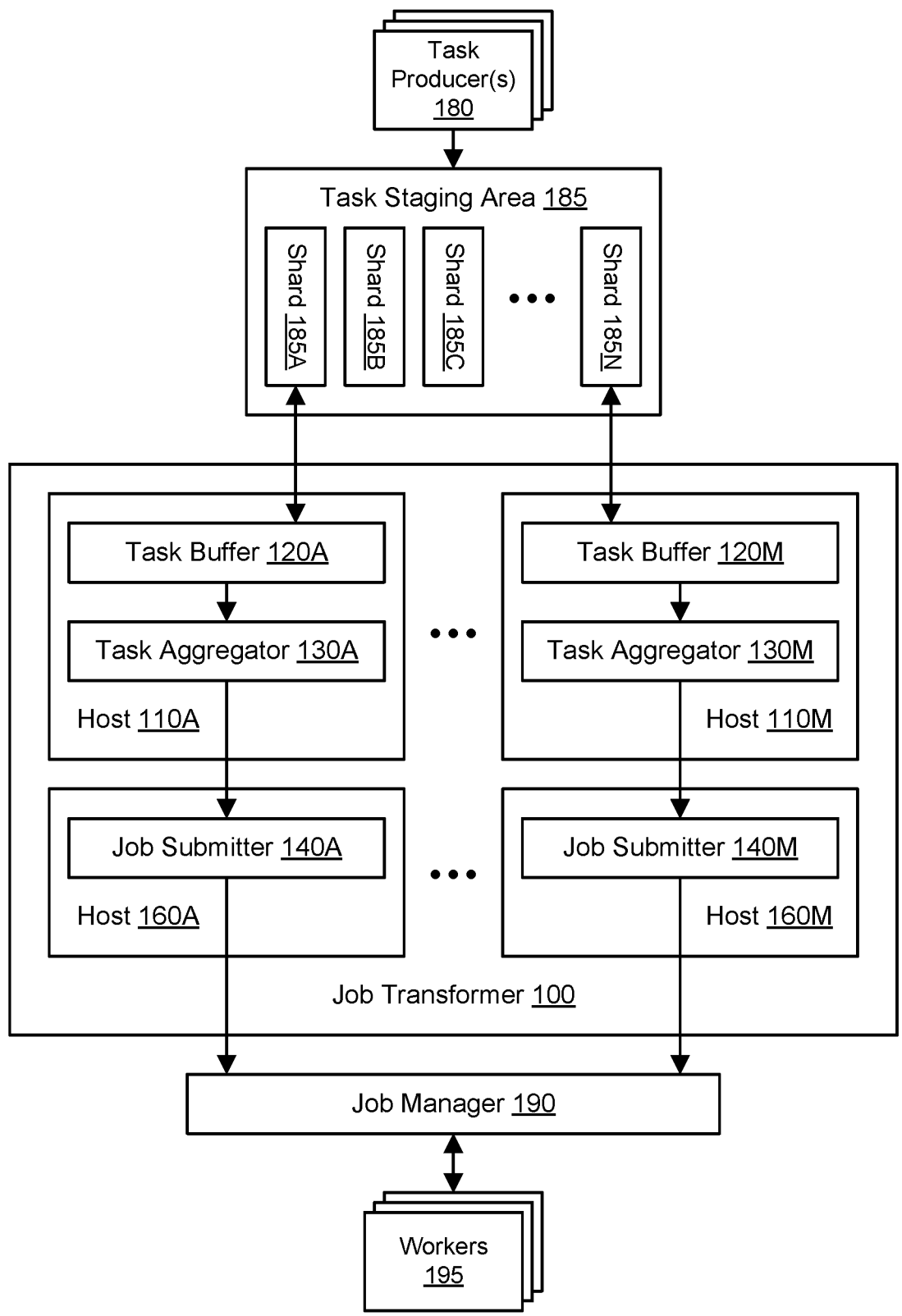
FIG. 1A and FIG. 1B illustrate an example system environment for scalable job transformation and management, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for scalable job transformation and management are described. Using the techniques described herein, output data of one system may be aggregated and transformed into input data for another system. The data may represent tasks to be processed by a job manager. For example, the tasks may describe or represent storage objects that are eligible to be transitioned from one storage class to another storage class. The tasks may be produced in relatively small batches (e.g., 10,000 tasks per batch), but the job manager may expect much larger batches (e.g., millions of tasks per batch) in order to process the tasks efficiently, and so the data from many batches may be aggregated into a single job. The format expected by the job manager may differ from the format of tasks as generated by the task producer, and so the data may also be transformed between the two formats. The aggregation and transformation may be performed by a job transformer that employs multiple hosts working in parallel. The input data may be sharded according to criteria such as characteristics of the data or its origins (e.g., the source of the data, the client that owns the data, and so on), and data for a particular shard may be acquired by a particular host based (at least in part) on a mapping of shards to hosts. In aggregating many batches into one job, tasks accumulated at a host may be grouped according to a common characteristic such as a client identifier or a storage resource identifier associated with the task. The number of job transformation hosts may be auto-scaled based on metrics without necessarily altering the number of other components, e.g., in order to adapt the job transformation to the amount of input data. The status of jobs may also be tracked by a state tracking component associated with the job transformer, and the job transformer may perform status-dependent actions with respect to jobs. The number of state tracking hosts may also be auto-scaled based on metrics, independently of other components. Using these techniques, a job transformer may enable the output of one system to be used as the input to another system in an efficient and scalable manner.

As one skilled in the art will appreciate in light of this disclosure, embodiments may be capable of achieving certain technical advantages, including some or all of the following: (1) improving the usability of a first system that produces output in one format and a second system (a job manager) that expects input in another format by transforming data between the formats; (2) improving the speed of task processing by a job manager by reducing the overhead associated with many small batches of input and instead aggregating the small batches into one large job; (3) improving the availability and performance of a fleet of job transformation hosts by sharding input based on input characteristics or criteria; (4) improving the availability and performance of a fleet of job transformation hosts by scaling the number of the hosts based on metrics; (5) improving the flexibility of job processing by monitoring the status of jobs and taking status-dependent actions with respect to the jobs; (6) improving the availability and performance of a fleet of state tracking hosts by scaling the number of the hosts based on metrics; and so on.

Figure 1B:
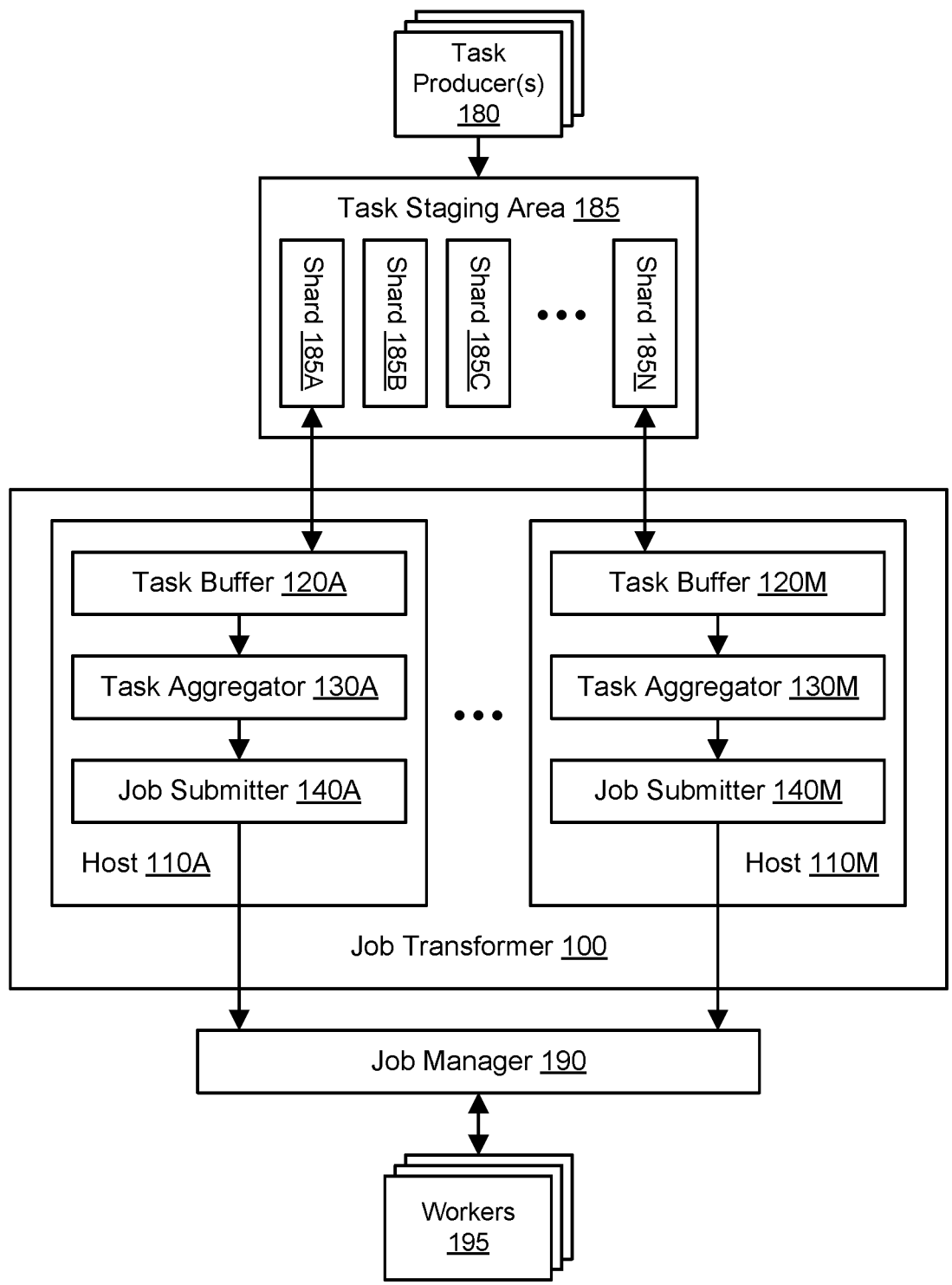

FIG. 1A and FIG. 1B illustrate an example system environment for scalable job transformation and management, according to one embodiment. A job transformer 100 may take task data produced by one or more task producers 180, aggregate and transform the data, and provide the aggregated and transformed data to a job manager 190. The task producer(s) 180 may operate on a periodic or continual basis to generate tasks 185A-185N. The tasks 185A-185N may be stored or referenced in a task staging area 185 which is accessible to the job transformer 100. The tasks 185A-185N may include data descriptive of one or more actions to be performed, one or more data sources for the action(s), one or more data targets for the action(s), and any other suitable metadata. For example, the tasks 185A-185N may describe or represent storage objects that are eligible to be transitioned from one storage class to another storage class, and the task producer(s) 180 may crawl a set of storage resources on a periodic basis to determine eligible storage objects. As further examples, the tasks 185A-185N may include replication of storage objects, deletion of storage objects, modification of metadata (e.g., ownership) for storage objects, and so on. A task may include sub-tasks or other partitions of the primary task.

In one embodiment, each batch of tasks may relate to a storage resource such as a storage bucket, e.g., as maintained by a storage service. A storage bucket or other resource may be owned by a particular client of the storage service. The tasks may be produced by the task producer(s) 180 in relatively small batches, e.g., 10,000 tasks per batch. The job manager 190 may be able to schedule such tasks for processing using a fleet of workers 195. However, the job manager 190 may expect much larger batches (e.g., millions of tasks per batch) than the task producer(s) 180 generate. In one embodiment, the job manager 190 may expect larger batches in order to process the tasks efficiently, e.g., by reducing the cumulative per-batch overhead from many small batches. Additionally, the format expected by the job manager 190 may differ from the format of tasks as generated by the task producer(s) 180. For example, the job manager 190 may expect input to have particular metadata that the task producer(s) 180 may not necessarily provide, or the job manager may expect input to have metadata in a particular format that differs from the format of metadata supplied by the task producer(s) 180. Using the job transformer 190, tasks from many batches may be aggregated into a single job, and the job may be expressed in a format required by the job manager 190.

In one embodiment, the job transformer 100 may employ multiple hosts working independently and in parallel. As shown in the example of FIG. 1A and FIG. 1B, the job transformer 100 may include host 110A through host 110M. However, it is contemplated that the job transformer may employ any suitable number and configuration of hosts. In one embodiment, as shown in FIG. 1A, one set of hosts 110A-110M may implement aggregation of tasks into jobs, while another set of hosts 160M-160M may implement submission of jobs to a job manager. The different sets of hosts may be scaled independently of one another, and the number of hosts 110A-110M may be the same as or different than the number of hosts 160A-160M. In one embodiment, as shown in FIG. 1B, the same set of hosts 110A-110M may implement both task aggregation and job submission.

In one embodiment, the input data to the job transformer 100 may be distributed among multiple shards. For example, as shown in FIG. 1A and FIG. 1B, the tasks may be divided into shards or other partitions such as 185A, 185B, and 185C through 185N. However, it is contemplated that the job transformer 100 may accept input data using any suitable number and configuration of shards. The input data may be sharded according to one or more criteria or characteristics of the data, such as the source of the data, the client that owns the data, and so on. For example, tasks associated with one storage bucket may be restricted to one shard, while tasks associated with another storage bucket may be restricted to another shard. As another example, tasks associated with one customer identifier may be restricted to one shard, while tasks associated with another customer identifier may be restricted to another shard. Shards may represent different partitions of the tasks generated by the task producer(s) 180. Using a mapping of shards to hosts, the tasks for a particular shard may be routed to a particular host based (at least in part) on a mapping of shards to hosts. For example, as shown in FIG. 1A and FIG. 1B, shard 185A may be assigned to host 110A, while shard 185N may be assigned to host 110M. In one embodiment, a one-to-one mapping of shards to hosts may be used. In various embodiments, a host may be responsible for more than one shard, or one shard (e.g., a particularly large shard) may be mapped to multiple hosts. In one embodiment, sharding of tasks may be deterministic according to the specified criteria and not random or pseudo-random. For example, tasks may be sharded using a consistent hashing mechanism. By sharding the data among independent hosts working in parallel, the job transformer 100 may perform job transformation tasks efficiently while maintaining a degree of fault tolerance.

A host may accumulate input tasks into a task buffer. For example, host 110A may include a task buffer 120A, and host 110M may include a task buffer 120M. In one embodiment, the task buffers 120A-120M may be implemented using persistent storage resources such that a host may failover to another host with minimal loss of data. At a particular host, tasks may be acquired in batches at various points in time and stored in the host's task buffer. In one embodiment, a host may poll the staging area 185 for tasks belonging to a shard assigned to the host. In one embodiment, a host may periodically scan through all pending tasks in the staging area 185 in order to find and acquire the tasks belonging to the shard(s) assigned to the host. A host may have no knowledge or understanding of the task producer(s) 180 and may have no direct contact with the task producer(s) but may instead interact with the task staging area 185. In one embodiment, tasks may be acquired in a different order than the tasks were produced. In some use cases, such as the aggregation of tasks for transitioning storage objects between storage classes, the order of receipt of the tasks may be irrelevant to the proper processing of the tasks. In one embodiment, batches of tasks may be accumulated in the task buffer for some duration of time until the batches are ready for aggregation. In one embodiment, the input batches may be deemed ready for aggregation when the cumulative size of the batches reach a threshold size, e.g., in the number of tasks. In one embodiment, the input batches may be deemed ready for aggregation when a threshold time has been reached, e.g., so that the tasks are not permitted to become stale.

A host may include a task aggregator that aggregates small batches into a larger batch (referred to herein as a job) that is usable by the job manager 190. For example, host 110A may include a task aggregator 130A, and host 110M may include a task aggregator 130M. A job generated by the task aggregator may list, indicate, or otherwise represent constituent tasks that had previously accumulated in the task buffer. In aggregating many batches of tasks into one job, tasks accumulated at a host may be grouped according to a common characteristic. For example, accumulated tasks associated with one customer identifier may be aggregated into one job, while tasks associated with another customer identifier may be aggregated into another job. As another example, accumulated tasks associated with one storage resource (e.g., bucket) identifier may be aggregated into one job, while tasks associated with another storage resource (e.g., bucket) identifier may be aggregated into another job. In one embodiment, the common characteristic may be the same as one or more of the criteria that are associated with a particular shard assigned to the host; for example, both the common characteristic and the shard criterion may include a storage resource identifier of a storage resource such as a bucket. In one embodiment, the common characteristic may differ from the criteria that are associated with a particular shard assigned to the host; for example, the common characteristic may include a storage resource identifier of a storage resource such as a bucket, while the shard criteria may include a partition identifier of a partition that includes multiple storage resources. Metadata suitable for grouping tasks in this manner may be provided with the tasks 185 by the task producer(s) 180. In one embodiment, the task aggregator may transform the format of the small batches into a format expected by the job manager 190. For example, the task aggregator 130A may add metadata to a job so that the job manager can schedule constituent tasks, maintain a job or task status, and so on. Such metadata may be represented in a different format in the batches of tasks 185 received by the job transformer 190.

After a job is generated using the task aggregator, the job may be submitted by a job submitter to the job manager. In one embodiment, the job transformer 100 may include a fleet of hosts 160A-160M that implement job submission independently of the hosts 110A-110M that implement task aggregation. For example, various hosts 160A-160M may provide a job submitter 140A through a job submitter 140M. The job may also be referred to as a manifest, the task aggregator may be referred to as a manifest preparer, and the job submitter may be referred to as a manifest submitter. The job manager may schedule the constituent tasks in a job for processing using a fleet of workers 195. The workers 195 may include a fleet of computing devices that are configured to operate in parallel to perform the tasks. For example, if the tasks indicate storage objects that are eligible to transition between storage classes, then the workers 195 may implement the transition by interacting with a storage service that stores the storage objects.

Figure 7:
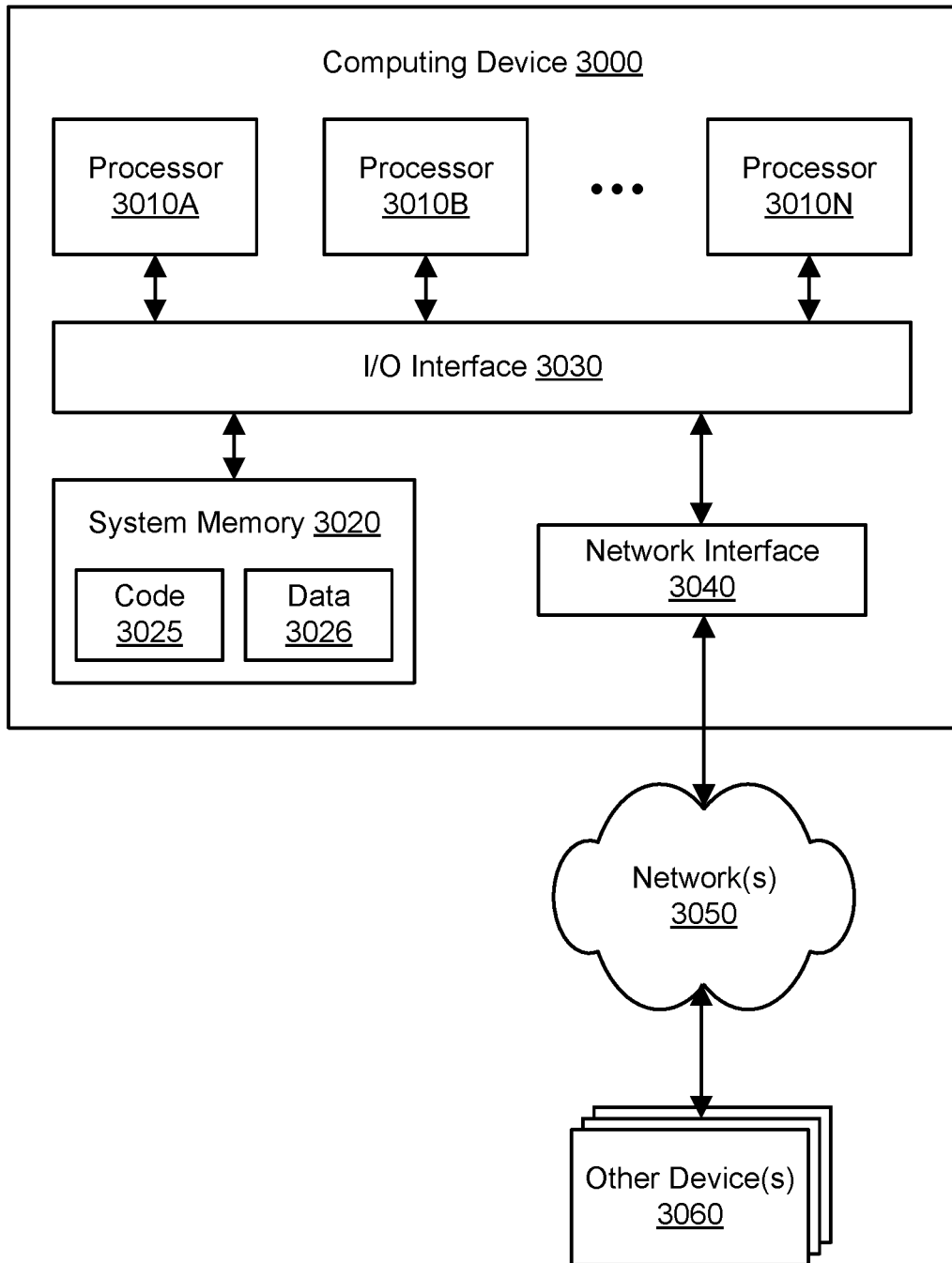
FIG. 7 illustrates an example computing device that may be used in some embodiments.

The job transformer 100, task producer(s) 180, job manager 190, and workers 195 may be implemented using any suitable number and configuration of computing devices, any of which may be implemented by the example computing device 3000 illustrated in FIG. 7. The computing devices may be located in any suitable number of data centers or geographical locations. In various embodiments, at least some of the functionality of the job transformer 100 may be provided by the same computing device or by different computing devices. If any of the components of the job transformer 100 are implemented using different computing devices, then the components and their respective computing devices may be communicatively coupled, e.g., via one or more networks. Each of the components of the job transformer 100 may represent any combination of software and hardware usable to perform their respective functions, as discussed as follows. Operations implemented by job transformer 100, task producer(s) 180, and job manager 190 may be performed automatically, e.g., without a need for user initiation or user intervention after an initial configuration stage, and programmatically, e.g., by execution of program instructions on at least one computing device. It is contemplated that the job transformer 100, task producer(s) 180, and job manager 190 may include additional components not shown, fewer components than shown, or different combinations, configurations, or quantities of the components shown.

The job transformer 100, task producer(s) 180, and job manager 190 may be implemented in a service-oriented system in which multiple services collaborate according to a service-oriented architecture. In such an environment, the job transformer 100 may offer its functionality as service to multiple clients. In one embodiment, any of the clients (e.g., task producer(s) 180) may provide batches of tasks to be processed using the job manager 190. It is contemplated that any suitable number and configuration of clients may interact with the job transformer 100. To enable clients to invoke its functionality, the job transformer 100 may expose any suitable interface(s), such as one or more APIs or other programmatic interfaces and/or graphical user interfaces (GUIs). A service of the job transformer 100 may be implemented using a plurality of different instances that are distributed throughout one or more networks, and each instance may offer access to the functionality of the corresponding service to various clients. The functionality of the job transformer 100 may be offered to the clients in exchange for fees.

The job transformer 100, task producer(s) 180, and job manager 190 may interact by conveying network-based service requests and potentially by receiving responses to those requests. In various embodiments, the network(s) may encompass any suitable combination of networking hardware and protocols necessary to establish network-based communications between the different components shown in FIG. 1A and FIG. 1B. For example, the network(s) may generally encompass the various telecommunications networks and service providers that collectively implement the Internet. The network(s) may also include private networks such as local area networks (LANs) or wide area networks (WANs) as well as public or private wireless networks. For example, two of the components shown in FIG. 1A and FIG. 1B may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between a first component and the Internet as well as between the Internet and a second component. In some embodiments, components may communicate using a private network rather than the public Internet.

In one embodiment, job transformer 100, task producer(s) 180, job manager 190, and workers 195 may be implemented using computing resources of a provider network. A provider network may represent a network set up by an entity such as a company or a public sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on. In one embodiment, the provider network may include a resource manager that permits hosts 110A-110M and hosts 160A-160M to be provisioned from one or more resource pools and potentially returned to the resource pools. For example, the resource manager may receive a request for one or more hosts from a component associated with the job transformer 100, identify and provision appropriate compute instances, and provide those instances to the job transformer for its sole and exclusive use for some period of time.

The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 2:
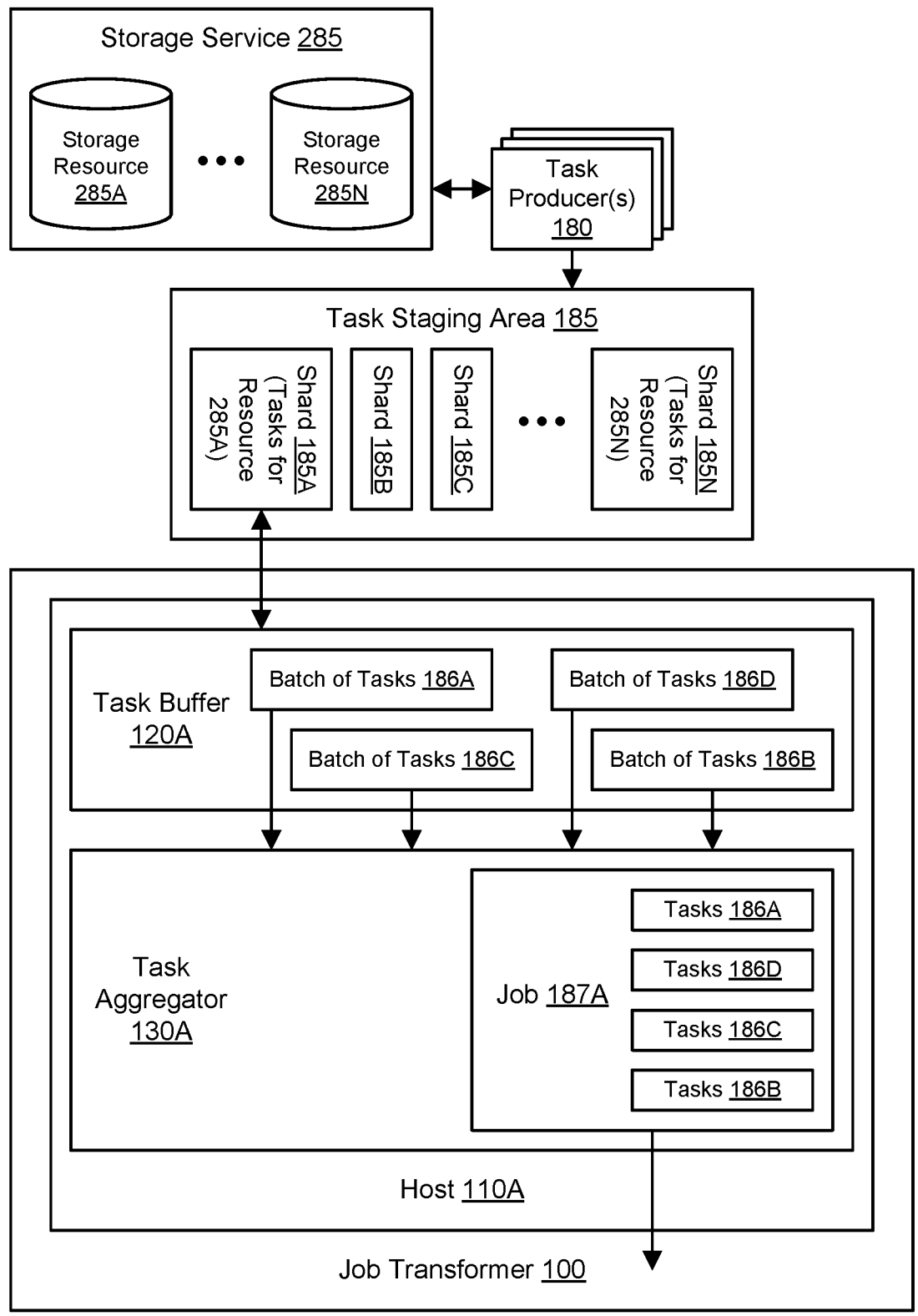
FIG. 2 illustrates further aspects of the example system environment for scalable job transformation and management, including aggregation of small batches into a larger job, according to one embodiment.

FIG. 2 illustrates further aspects of the example system environment for scalable job transformation and management, including aggregation of small batches into a larger job, according to one embodiment. As discussed above, the tasks 185 may describe or represent storage objects that are eligible to be transitioned from one storage class to another storage class. As shown in the example of FIG. 2, a storage service 285 may maintain a set of storage resources 285A-285N. The storage resources 285A-285N may represent buckets, and each bucket may include a set of storage objects. The storage objects may include or be identified by keys. In one embodiment, a storage resource may be "owned" by a particular client of the storage service 285, such that the service may manage the resource exclusively on behalf of that client. In one embodiment, the task producer(s) 180 may review the storage resources 285A-285N on a periodic basis (e.g., daily) to find any storage objects that meet particular criteria. In one embodiment, the criteria may relate to a storage lifecycle. For example, the criteria may represent criteria for eligibility of a storage object to be transitioned (or migrated) from one storage class to another storage class. The storage service 285 may offer different storage classes that differ in their features. For example, a Standard storage class may offer high durability, availability, and performant object storage for frequently accessed data, while delivering low latency and high throughput. As another example, a Standard-Infrequent Access storage class may offer the high durability, throughput, and low latency of the Standard storage class, but at a lower cost, and intended for data that is accessed less frequently but that requires rapid access when needed. As yet another example, a Glacier storage class may offer a secure, durable, and low-cost option for data archiving. A lifecycle management system may perform automated migration of storage objects (e.g., keys in buckets) from one storage class to another storage class.

A batch of tasks may be finalized by the task producer(s) 180 at any suitable time, e.g., when a maximum batch size is reached or when a time limit is reached. In one embodiment, the tasks may be provided by the task producer(s) 180 to a task staging area 185. In one embodiment, the tasks themselves may be stored in the storage service, and the locations of those tasks may be provided via the staging area 185 to the relevant hosts for job transformation for retrieval. As discussed above, the tasks may be divided among a set of shards 185A-185N. In one embodiment, each storage resource in the storage service may be assigned to one or more shards. For example, as shown in FIG. 2, tasks involving the storage resource 285A may be assigned to the shard 185A, while tasks involving the storage resource 285N may be assigned to the shard 185N. In the example of FIG. 2, the shard 185A may be mapped to the host 110A. In one embodiment, one or more additional shards 185B-185N may also be assigned to the host 110A. Various batches in the shard 185A may be acquired by the host 110A from the staging area 185 at various times and may then be stored in the task buffer 120A. For example, various batches 186A, 186B, 186C, and 186D may be acquired by the host 110A and stored in its task buffer 120A. The batches 186A, 186B, 186C, and 186D may be acquired by the host 110A in a different order than they were produced or placed in the event stream. However, the task aggregation performed by the job transformer 100 may be tolerant of out-of-order delivery, e.g., for tasks that are not dependent on one another.

The task aggregator 130A at the host 110A may aggregate the batches 186A, 186B, 186C, and 186D (and potentially many more) into a single job 187A. The job 187A may represent a different format than the individual batches 186A, 186B, 186C, and 186D, e.g., such that the job includes a different form or configuration of metadata. In one embodiment, the task aggregator 130A may produce the job 187A after a sufficient number of batches or tasks have been received and stored in the task buffer 120A. In one embodiment, each of the batches 186A, 186B, 186C, and 186D may have a maximum size that is much smaller than the size of the job 187A. In one embodiment, for example, the input batches may not exceed 10,000 tasks each, while the job 187A may represent hundreds of thousands or even millions of tasks. In aggregating many batches of tasks into one job 187A, tasks accumulated at the host 110A may be grouped according to a common characteristic. For example, accumulated tasks associated with one customer identifier may be aggregated into one job 187A, while tasks associated with another customer identifier may be aggregated into another job. As another example, accumulated tasks associated with one storage resource (e.g., bucket) identifier 285A may be aggregated into one job 187A, while tasks associated with another storage resource (e.g., bucket) identifier may be aggregated into another job. As discussed above, the characteristic(s) for task aggregation may be the same as or different than the one or more criteria for task sharding. In one embodiment, the batches 186A, 186B, 186C, and 186D may be aggregated into the job 187A by sending the storage service a list of keys for storage objects (but not contents of the storage objects) with an instruction to combine the keys inside the storage service. A job submitter 140A may then submit the job 187A to the job manager 190 for scheduling of its constituent tasks. In one embodiment, the job 187A itself may be stored in the storage service, and the location of the job may be provided to the job manager 190.

Figure 3:
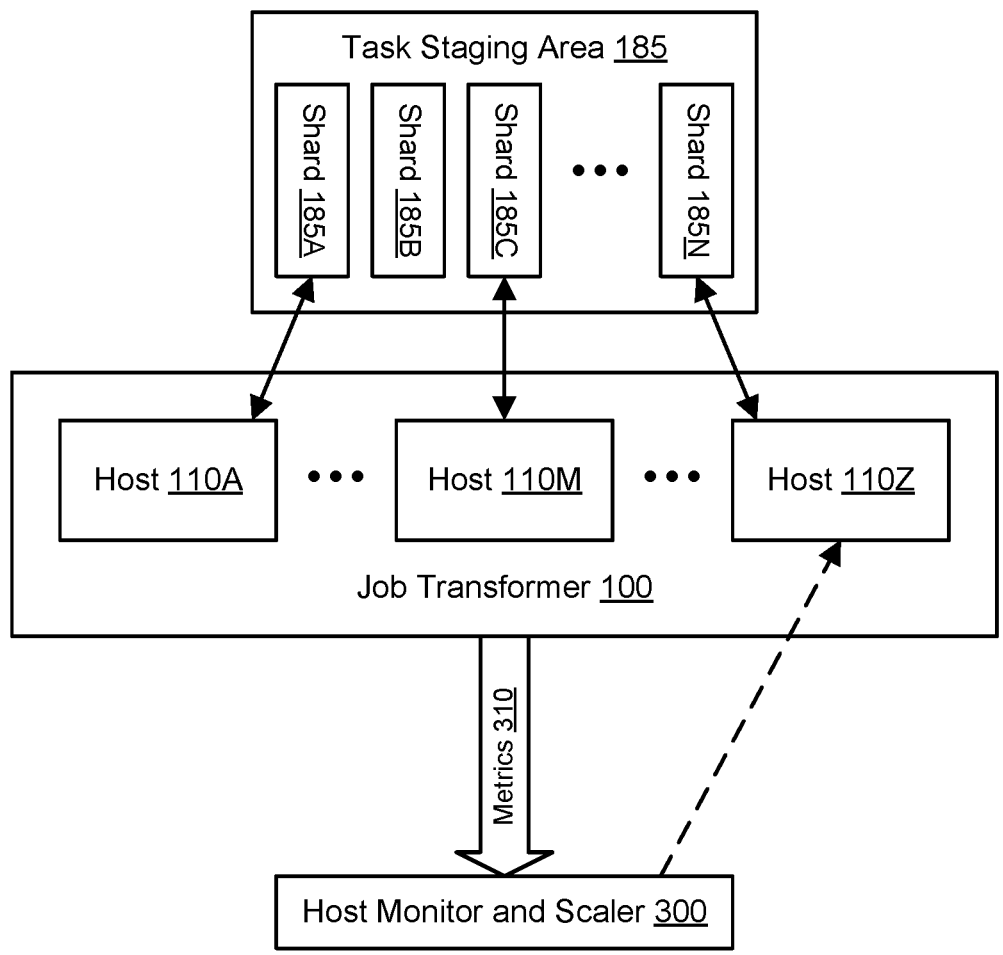
FIG. 3 illustrates further aspects of the example system environment for scalable job transformation and management, including scaling of hosts associated with a job transformer, according to one embodiment.

FIG. 3 illustrates further aspects of the example system environment for scalable job transformation and management, including scaling of hosts associated with a job transformer, according to one embodiment. In one embodiment, the number of job transformation hosts may be auto-scaled such that the number of hosts is adapted to the performance of the job transformer 100. In one embodiment, metrics 310 may be collected by a component such as a host monitor and scaler 300. The metrics 310 may relate to the performance of the existing hosts 110A-110M in aggregating and transforming tasks. Based (at least in part) on these metrics 310, the host monitor and scaler 300 may periodically remove one or more hosts from the fleet or may add one or more hosts to the fleet. As shown in the example of FIG. 3, one or more additional hosts through host 110Z may be added to the prior set of hosts 110A-110M, e.g., if the performance of the hosts 110A-110M has decreased below some threshold. In one embodiment, the host monitor and scaler 300 may interact with a resource manager of a provider network to provision additional hosts and/or deprovision unnecessary hosts. The hosts may be scaled without necessarily altering the number of other components, e.g., in order to adapt the job transformer 100 to the changing amount of input data and/or to changing conditions throughout the system. Along with auto-scaling the hosts 110A-110Z, the shards 185A-185N may be redistributed among the new fleet of hosts, and the mapping of shards to hosts may be updated. As shown in the example of FIG. 3, shard 185A may continue to be associated with host 110A, while shard 185C may be reassigned to host 110M, and shard 185N may be reassigned from host 110M to new host 110Z.

Figure 4:
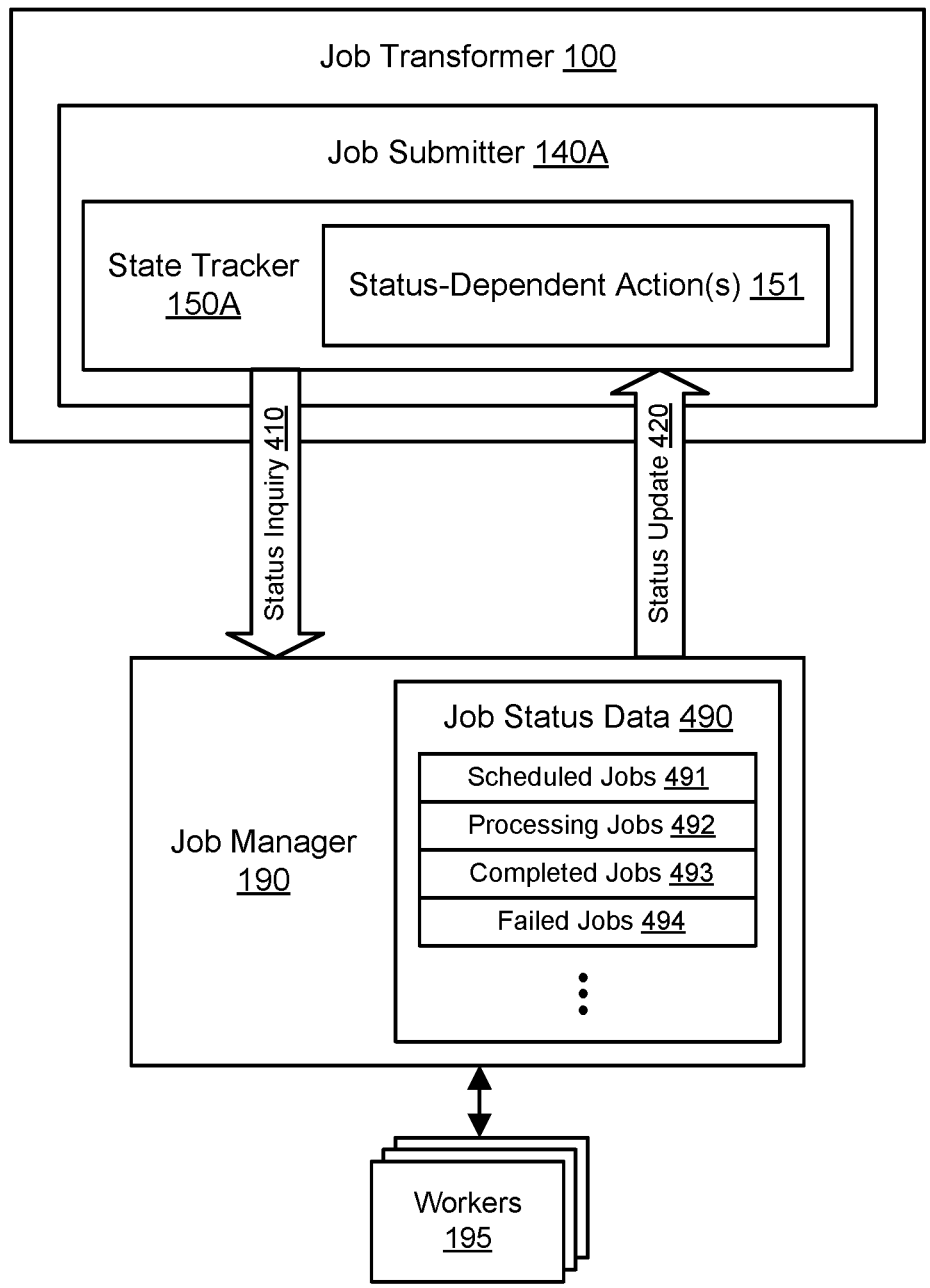
FIG. 4 illustrates further aspects of the example system environment for scalable job transformation and management, including the use of a state tracker to perform status-dependent actions for jobs, according to one embodiment.

FIG. 4 illustrates further aspects of the example system environment for scalable job transformation and management, including the use of a state tracker to perform status-dependent actions for jobs, according to one embodiment. In one embodiment, a state tracking component may provide visibility into the status of jobs. The job manager 190 may maintain job status data 490 for jobs submitted to the job manager. For example, the job status data 490 may include metadata for scheduled (but not yet processed) jobs 491, metadata for jobs 492 that are currently processing, metadata for completed jobs 493, metadata for failed jobs 494, and so on. In one embodiment, the job status data 490 may include task-level metadata, such as the number of tasks or percentage of tasks associated with a particular job that are in a particular state (e.g., scheduled, processing, completed, failed). The state tracker 150A for a particular job submitter 140A may periodically inquire as to the status of a job submitted to the job manager 190, e.g., until the job is completed or canceled. In response to this status inquiry 410, the job manager 190 may provide the state tracker 150A with a status update 420 for the job. Based (at least in part) on the status update 420, the state tracker (or another component of the job transformer 100) may take one or more status-dependent actions 151. For example, if processing of the job has not yet begun but the task producer(s) 180 have begun another cycle, then the action(s) 151 may include cancelation of the job and deletion of the job from the storage service. As another example, if the job has not begun processing after some threshold period of time has expired since the job was submitted, then the state tracker 150A may request cancelation of the job and delete the job from the storage service. As yet another example, if a job has failed, then the action(s) 151 may include generating a notification to the client associated with the job. In the use case of transitioning storage objects between storage classes, the tasks for a canceled or failed job may be regenerated by the task producer(s) 180 and resubmitted by the job transformer 100 at a later time. In some embodiments, custom actions and/or custom statuses may be specified by clients for automated management of their storage resources using the state tracker 150A.

Figure 5A:
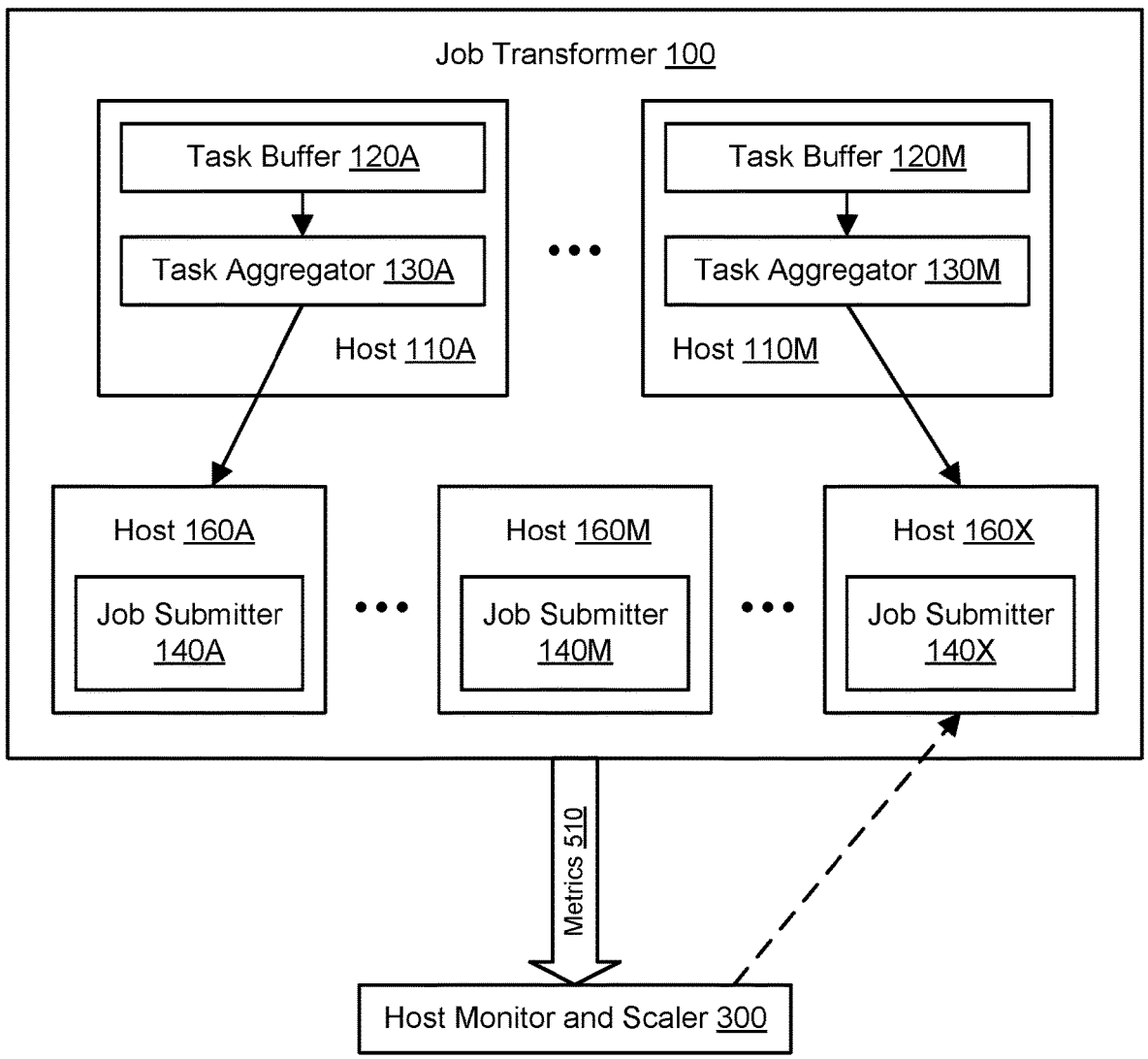
FIG. 5A and FIG. 5B illustrate further aspects of the example system environment for scalable job transformation and management, including scaling of hosts associated with a state tracker, according to one embodiment.
Figure 5B:
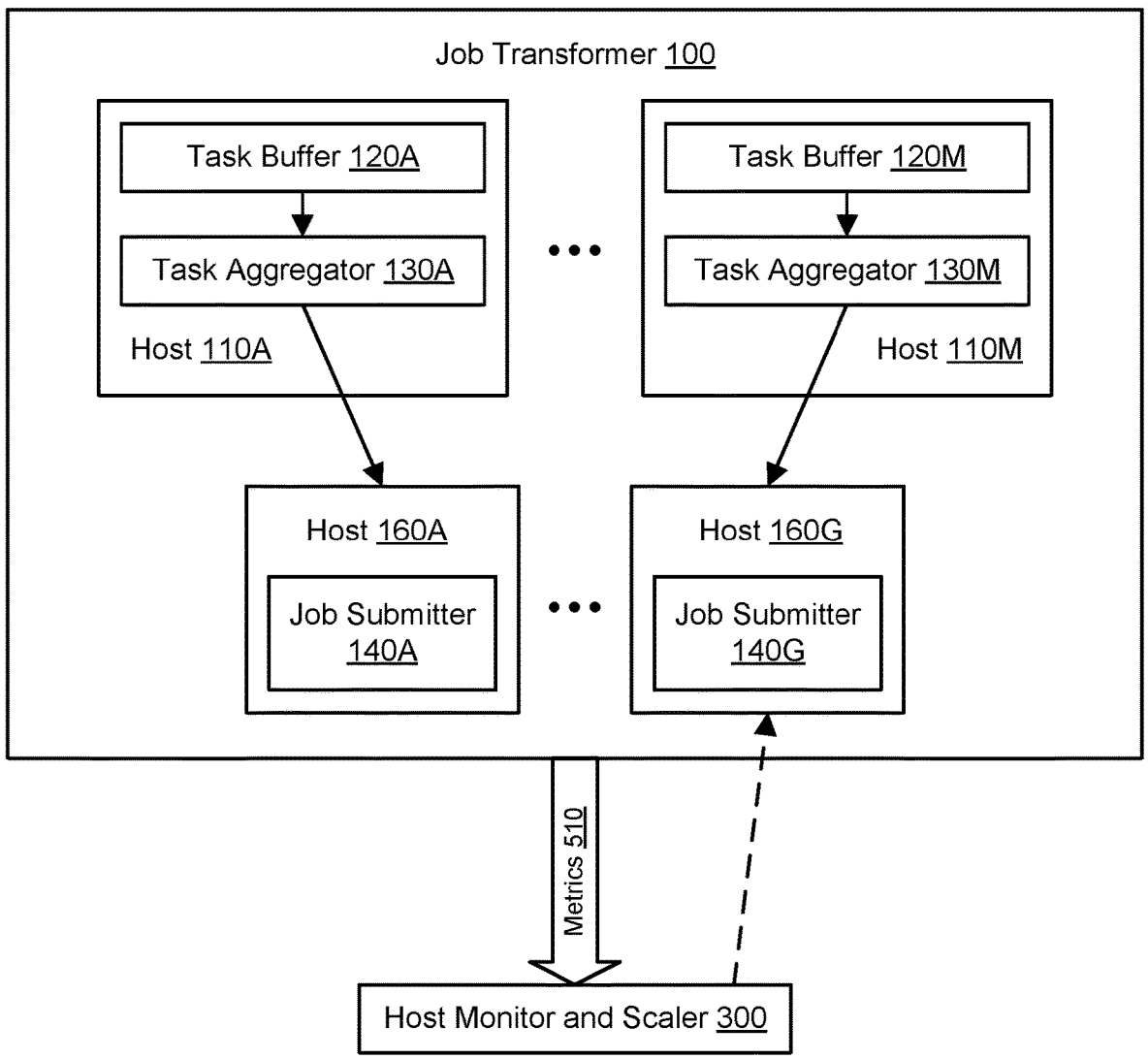

FIG. 5A and FIG. 5B illustrates further aspects of the example system environment for scalable job transformation and management, including scaling of hosts associated with a state tracker, according to one embodiment. In one embodiment, a fleet of job submitter hosts may each implement a state tracker. The job submitter hosts may be auto-scaled based on metrics, independently of other components such as task aggregation hosts. In one embodiment, metrics 510 may be collected by a component such as the host monitor and scaler 300. The metrics 510 may relate to the performance of the existing job submitter hosts (such as host 160A) in submitting jobs and/or status tracking and performing status-dependent actions. In one embodiment, the metrics 510 may be provided by the job manager 190, e.g., so that the number of job submitter hosts may be scaled according to the rate of work expected by the job manager. Based (at least in part) on these metrics 510, the host monitor and scaler 300 may periodically remove one or more job submitter hosts from the fleet or may add one or more hosts to the fleet.

As shown in the example of FIG. 5A, one or more additional job submitter hosts through host 160X (including job submitter 140X) may be added to the prior set of hosts including host 160A-160M, e.g., if the performance of the hosts has decreased below some threshold. As shown in the example of FIG. 5B, the fleet of job submitter hosts may be reduced to host 160A through host 160G (including job submitter 140G), e.g., if a larger fleet of hosts is not needed at the current time. In either case, the number of job submitter hosts may be scaled independently of the number of task aggregation hosts. In one embodiment, the host monitor and scaler 300 may interact with a resource manager of a provider network to provision additional job submitter hosts and/or deprovision unnecessary job submitter hosts. The job submitter hosts may be scaled without necessarily altering the number of other components, e.g., in order to adapt the job transformer 100 to the changing amount of input data and/or to changing conditions throughout the system.

Figure 6:
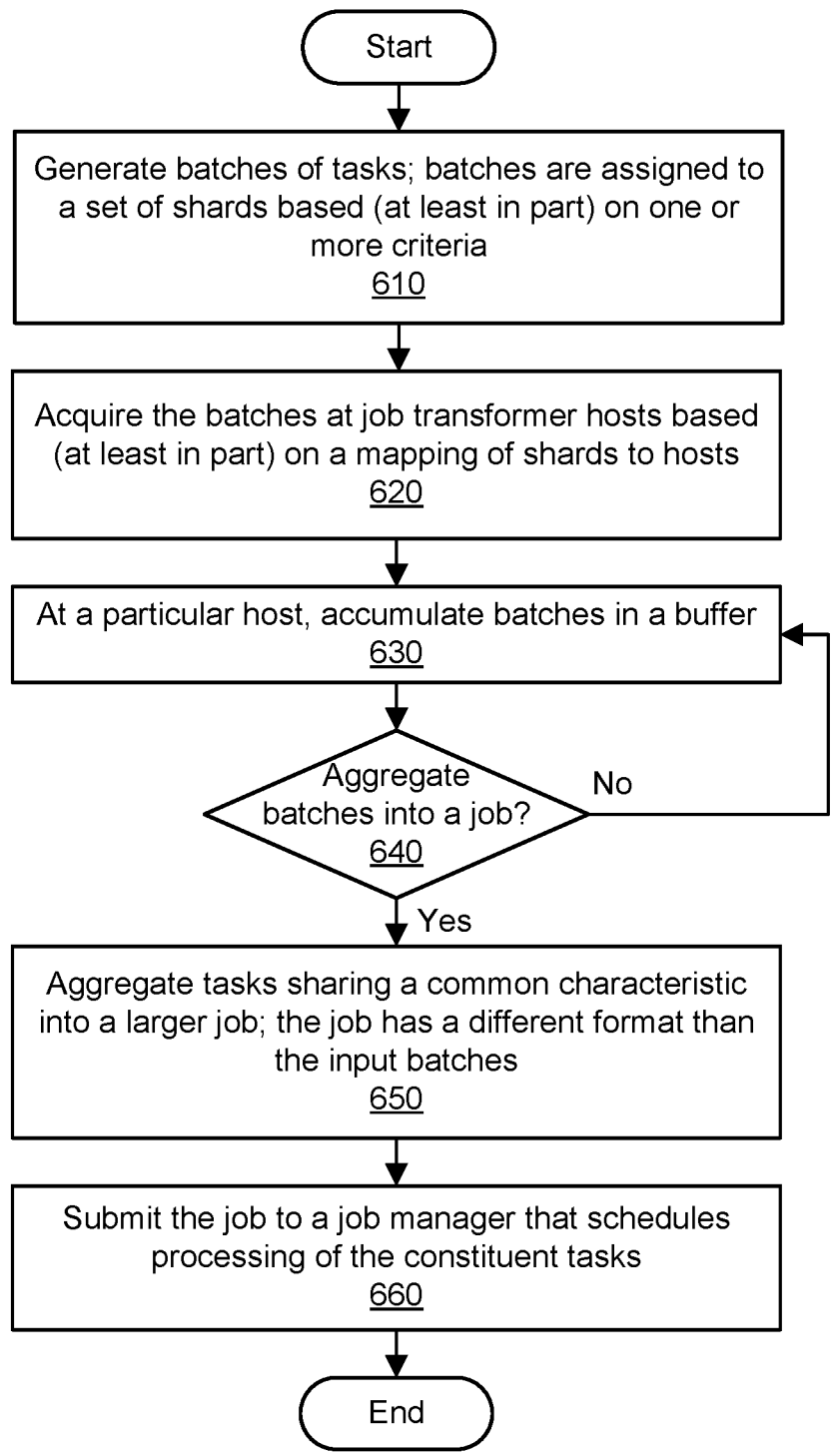
FIG. 6 is a flowchart illustrating a method for job management, according to one embodiment.

FIG. 6 is a flowchart illustrating a method for job management, according to one embodiment. As shown in 610, batches of tasks may be generated. The batches may be provided by one or more task producers to an event stream. The batches may be assigned to a set of shards on a deterministic basis, such that tasks meeting one or more criteria are restricted to a particular shard. For example, the criteria may include a storage partition associated with a task, a storage object associated with a task, an owner of the storage object associated with the task, and so on. As shown in 620, the batches may be acquired by individual hosts in a fleet of hosts of a job transformer. The batches may be acquired based on a mapping of shards to hosts. In one embodiment, a host may traverse pending tasks in a task staging area to determine and acquire tasks belonging to one or more shards assigned to the host. The number of hosts may be modified periodically, and the mapping may also be modified to redistribute the shards among the available hosts to optimize performance across the fleet of hosts.

As shown in 630, batches of tasks may be accumulated and stored in a buffer at a particular host. The batches may originate from one or more shards. As shown in 640, the method may determine whether to aggregate the stored batches (e.g., sharing a common characteristic) into a larger job. In one embodiment, the decision to aggregate batches (e.g., sharing a common characteristic) into a job may be made based (at least in part) on the cumulative size of the batches in the buffer. In one embodiment, the decision to aggregate batches (e.g., sharing a common characteristic) into a job may be made based (at least in part) on the time elapsed since the batches were stored in the buffer. In one embodiment, the common characteristic may be the same as one or more of the shard criteria; for example, both the common characteristic and a shard criterion may include a storage resource identifier of a storage resource such as a bucket. In one embodiment, the common characteristic may differ from the shard criteria; for example, the common characteristic may include a storage resource identifier of a storage resource such as a bucket, while the shard criteria may include a partition identifier of a partition that includes multiple storage resources. If the batches are not ready to be aggregated, then the method may continue to accumulate batches of tasks in the buffer, as shown in 630.

As shown in 650, if the batches are deemed ready to be aggregated, then at least some of the stored batches may be aggregated into a larger job. In one embodiment, each of the batches may have a maximum size that is much smaller than the size of the job. In one embodiment, for example, the input batches may not exceed 10,000 tasks each, while the job may represent hundreds of thousands or even millions of tasks. In aggregating many batches of tasks into one job, tasks accumulated at the host may be grouped according to one or more common characteristics. For example, accumulated tasks associated with one customer identifier may be aggregated into one job, while tasks associated with another customer identifier may be aggregated into another job. As another example, accumulated tasks associated with one storage resource (e.g., bucket) identifier may be aggregated into one job, while tasks associated with another storage resource (e.g., bucket) identifier may be aggregated into another job. As shown in 660, the job may be submitted to a job manager that schedules processing of constituent tasks using a fleet of workers.

Illustrative Computer System

In at least some embodiments, a computer system that implements a portion or all of one or more of the technologies described herein may include a computer system that includes or is configured to access one or more computer-readable media. FIG. 7 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multi-processor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
 a plurality of computing devices comprising one or more processors and memory and configured to implement a job transformer, wherein the job transformer is configured to:
  receive a plurality of batches of tasks expressed in a first format, wherein one or more tasks are assigned to individual shards of a plurality of shards based at least in part on one or more deterministic criteria, wherein individual computing devices of the plurality of computing devices are associated with one or more of the plurality of shards, and wherein the tasks are distributed among a set of the computing devices based at least in part on the shards to which the tasks are assigned, and the computing devices associated with the shards;
  determine, at one of the set of the computing devices, a subset of the distributed tasks having a common characteristic among the subset;
  aggregate and transform the subset of the distributed tasks having the common characteristic among the subset into a job expressed in a second format, wherein the job represents the subset of the tasks; and provide the job to a job manager, wherein the job manager schedules processing of the subset of the tasks using a plurality of workers.

2. The system as recited in claim 1, wherein the job transformer is further configured to:
request, from the job manager, a status of the job; and
initiate one or more actions based at least in part on the status of the job.

3. The system as recited in claim 1, further comprising:
one or more computing devices configured to implement a monitoring component, wherein the monitoring component is configured to:
increase or decrease a quantity of the set of the computing devices based at least in part on one or more metrics associated with the job transformer; and
redistribute the shards among the set of the computing devices.

4. The system as recited in claim 1, wherein the tasks are associated with storage objects that are determined to be eligible to transition from a first storage class to a second storage class, and wherein processing of the subset of the tasks comprises transitioning at least some of the storage objects from the first storage class to the second storage class.

5. A computer-implemented method, comprising:
receiving, at a host of a set of hosts that implement a job transformer, a plurality of tasks expressed in a first format, wherein the tasks are associated with a shard identifier that identifies a shard of a plurality of shards based at least in part on one or more criteria, wherein the shard identifier that identifies the shard is associated with the host, and wherein the tasks are acquired by the host based at least in part on the shard identifier which the tasks and the host are associated with;
determining a subset of the acquired tasks having a common characteristic among the subset;
aggregating the subset of the acquired tasks having the common characteristic among the subset into a job expressed in a second format, wherein the job represents the subset of the tasks; and
providing the job to a job manager, wherein the subset of the tasks are scheduled for processing using the job manager.

6. The method as recited in claim 5, wherein a plurality of shard identifiers are distributed among the set of hosts, and wherein the method further comprises:
modifying a quantity of the hosts based at least in part on one or more metrics associated with the job transformer; and
redistributing the plurality of shard identifiers among the set of hosts.

7. The method as recited in claim 5, further comprising:
requesting, from the job manager, a status of the job; and
initiating one or more actions based at least in part on the status of the job.

8. The method as recited in claim 7, wherein the one or more actions comprise cancelation of the job.

9. The method as recited in claim 7, wherein the status is requested by a state tracker comprising one or more state tracking hosts, and wherein the method further comprises:
modifying a quantity of state tracking hosts associated with the state tracker based at least in part on one or more metrics associated with the state tracker.

10. The method as recited in claim 5, wherein the one or more criteria include the common characteristic.

11. The method as recited in claim 5, wherein the one or more criteria differ from the common characteristic.

12. The method as recited in claim 5, wherein the tasks are associated with storage objects that are determined to be eligible to transition from a first storage class to a second storage class, and wherein processing of the subset of the tasks comprises transitioning at least some of the storage objects from the first storage class to the second storage class.

13. One or more non-transitory computer-readable storage media storing program instructions that when executed on or across one or more processors perform:
receiving, at a host of a set of hosts that implement a job transformer, a plurality of tasks expressed in a first format, wherein the tasks are deterministically assigned a shard identifier that identifies a shard of a plurality of shards based at least in part on one or more criteria associated with the shard identifier, wherein the shard identifier that identifies the shard is associated with the host, and wherein the tasks are acquired by the host based at least in part on the shard identifier which the tasks are deterministically assigned, and the host is associated with;
determining a subset of the acquired tasks having a shared characteristic among the subset;
batching the subset of the acquired tasks having the shared characteristic among the subset into a job, wherein the subset of the tasks are transformed from the first format to a second format; and
providing the job to a job manager, wherein the subset of the tasks are scheduled for processing using the job manager.

14. The one or more non-transitory computer-readable storage media as recited in claim 13, wherein a plurality of shard identifiers are distributed among the set of hosts, and wherein the program instructions are further computer-executable to perform:
adding or subtracting one or more of the hosts based at least in part on one or more metrics associated with the job transformer; and
redistributing the plurality of shard identifiers among the set of hosts.

15. The one or more non-transitory computer-readable storage media as recited in claim 13, wherein the program instructions are further computer-executable to perform:
requesting, from the job manager, a status of the job; and
initiating one or more actions based at least in part on the status of the job.

16. The one or more non-transitory computer-readable storage media as recited in claim 15, wherein the one or more actions comprise cancelation of the job.

17. The one or more non-transitory computer-readable storage media as recited in claim 15, wherein the status is requested by a state tracker comprising one or more state tracking hosts, and wherein the program instructions are further computer-executable to perform:
modifying a quantity of state tracking hosts associated with the state tracker based at least in part on one or more metrics associated with the state tracker.

18. The one or more non-transitory computer-readable storage media as recited in claim 13, wherein the shared characteristic represents a client identifier.

19. The one or more non-transitory computer-readable storage media as recited in claim 13, wherein the shared characteristic represents a storage resource identifier.

20. The one or more non-transitory computer-readable storage media as recited in claim 13, wherein the tasks are associated with storage objects that are determined to be eligible to transition from a first storage class to a second storage class, and wherein processing of the subset of the tasks comprises transitioning at least some of the storage objects from the first storage class to the second storage class.

* * * * *